United States Patent [19]

Turillon et al.

[11] 4,358,892

[45] Nov. 16, 1982

[54] METHOD OF PRODUCING BATTERY AND ELECTROLYTIC CELL ELECTRODES

[75] Inventors: Pierre P. Turillon, Ramsey, N.J.; Michael N. Hull; George F. Nordblom, both of Yardley, Pa.

[73] Assignees: The International Nickel Company, Inc., New York, N.Y.; ESB Corporation, Philadelphia, Pa.

[21] Appl. No.: 253,095

[22] Filed: Apr. 18, 1981

Related U.S. Application Data

[62] Division of Ser. No. 850,290, Nov. 10, 1977, Pat. No. 4,297,421.

[51] Int. Cl.³ .............................................. H01M 4/56
[52] U.S. Cl. ................................ 29/623.5; 427/126.3; 204/290 F; 29/623.1
[58] Field of Search .................... 427/126.3; 29/623.1, 29/623.5; 429/225–228, 210, 236, 245; 204/290 F, 290 G

[56] References Cited

U.S. PATENT DOCUMENTS

| 2,631,115 | 3/1953 | Fox | 429/219 |
| 3,437,525 | 4/1969 | Hauel et al. | 429/40 X |
| 3,499,795 | 3/1970 | Ruben | 429/228 X |
| 3,926,773 | 12/1975 | Koziol et al. | 204/290 F |

Primary Examiner—Francis S. Husar
Assistant Examiner—Jonathan L. Scherer
Attorney, Agent, or Firm—Francis J. Mulligan, Jr.; Ewan C. MacQueen

[57] ABSTRACT

A composite electrode having a structural electrode member with at least a portion of one surface of the electrode member constructed from a continuous matrix of an anodically passivatable metal infiltrated by a metal capable of forming an electroconductive oxide and having the infiltrating metal at the electrode surface oxidized such that an electric current path is provided through the oxidized surface of the matrix metal. In one embodiment the matrix metal is an electrochemical valve metal, e.g., titanium and the infiltrating metal is lead. Applications for the composite electrode include battery grids and electrochemical processing electrodes.

14 Claims, 13 Drawing Figures

METHOD OF PRODUCING BATTERY AND ELECTROLYTIC CELL ELECTRODES

This is a division, of application Ser. No. 850,290 filed Nov. 10, 1977, now U.S. Pat. No. 4,297,421.

BACKGROUND OF THE INVENTION

1. Field of the Invention

This invention relates to metal structures resistant to the harmful effects of concurrent oxidation and corrosion by aqueous electrolyte, and which are capable of conduction between the structure surface and an aqueous electrolyte when made anodic in said electrolyte. This invention more specifically relates to electrode structures for use in plates for lead-acid electric storage batteries and as electrodes for use in other electrochemical processes, usually in contact with an aqueous acidic electrolyte. It is a companion invention to an invention described in a concurrently filed application by the same inventors entitled Negative Electrode for Lead-Acid Storage Battery.

2. Definitions

For the purposes of clarity and conformity in the specification and the claims, the following terms will be defined.

The term "anodically passivatable metal" shall mean a metal which, when in contact with an electrolyte and made anodic within an effective potential range, becomes passive to that electrolyte, usually by formation of an oxidic film. For the purposes of the definition in this application, this oxidic film is a non-conductor of electricity.

The term "valve metal" shall mean an anodically passivatable metal, which metal when made cathodic in the electrolyte in which the metal acting as an anode becomes passivated, readily permits passage of current between the metal surface and the electrolyte, and which rapidly or intantaneously passivates when the current is reversed.

The term "matrix metal" includes the primary valve metals niobium, tantalum, titanium, zirconium and hafnium, and alloys containing more than about 85% of these valve metals and exhibiting essentially the same electrochemical valve characteristics as these metals. Matrix metal also includes silicon-containing materials which anodically form silicon dioxide rich surface coatings as well as aluminum and other anodically passivatable metals which may be severely limited with respect to electrolytes with which they can be used.

The terms "filling metal" or "infiltrating metal" shall include lead, and all metals that may be used in electric storage battery grids, such as tin and antimony, and alloys of lead and these metals as well as all other metals, (for example, manganese and ruthenium) which are characterized by having an electrochemically producible oxide which is an electroconductor and which is insoluble in a given aqueous electrolyte. A filling metal can also contain any dopants which may be added to it in order to impart certain desired characteristics. Dopants in lead may be calcium, arsenic, antimony, tin, silver, etc.

The term "oxidized filling metal" shall include oxidized products of the filling metal such as $PbO_2$, $SnO_2$, $Sb_2O_5$ or mixtures thereof, along with any dopants or possible contaminate from the path walls of matrix metal, such as $TiO_2$. When formulae such as $PbO_2$, $MnO_2$, etc., are used herein especially in regard to electroconductive oxides, it is to be observed that these oxides are not limited to exact stoichiometric compounds but rather include, for example, non-stoichiometric species such as $PbO_{1.9}$ which are well known to have enhanced electrical conductivity compared to true stoichiometric compounds.

The term "structural electrode member" shall mean that portion or portions of an electrode which provides mechanical strength to the electrodes as well as a path for electric conduction within the electrode. When this term is used in the context of a battery, it refers to the positive grid and does not include the active material which is in electrically conductive contact with the structural member. However, in the context of other electrochemical processes, for example, electrowinning, this term refers to the whole of the electrode.

The term "composite electrode" shall mean an electrode having a structural electrode member constructed in accordance with the invention disclosed and claimed herein, wherein the structural electrode member includes a composite of a matrix metal and filling metal. The structural electrode member may comprise the entire composite electrode, or only one of several elements.

Any reference in this specification to a particular metal or alloy as the matrix metal, filling metal or coating metal is made by way of example and not for the purpose of limiting the scope of the invention.

Description of the Prior Art

In general, conventional lead-acid batteries (Faure type) have positive plates made from battery grids covered with lead dioxide and have negative plates with grids covered with lead. When manufacturing these batteries, positive and negative plates are produced by first pasting the grids with lead oxide and lead salt mixtures, respectively. The pasted grids are then placed in a sulfuric acid solution for electrolytic forming, where the positive pasted material is oxidized to $PbO_2$ and the negative pasted material is reduced to pure lead sponge.

One mode of lead-acid battery failure results from corrosion of the grid and separation of active material from the plate, especially on the positive plate. This deleterious action results in part, from the oxidation-reduction reactions which take place between the plate and the electrolyte during the many charging and discharging cycles, thereby causing the current carrying capacity of the grid to decrease and its structural strength to be lost. Furthermore, the constant expansion and contraction of the active material during the charge and discharge cycles causes shedding of the active material from the grid.

Ideally, a battery grid is needed in which its corrosion in acid electrolyte during the electrochemical processes is controlled to balance the corrosion requirements for adhesion of active material with the corrosion limits to maintain optimum structural strength and current carrying capacity for the grid. Another consideration is that the grid be light enough to improve the energy density qualities of the battery.

Electrodes used for other electrochemical processes, such as electrowinning, are subjected to the same oxidative corrosion problem as discussed above for battery grids but of course are not usually electrically reversed. The life of electrowinning electrodes, as well as the purity of the cathode product, could be substantially improved if the electrode was constructed of a substance which resisted corrosion from the electrolyte and the electrochemical processes to which it is subjected.

Very few metals are known that will resist corrosion when placed in an acid environment. Three metals, among others, are known to have excellent acid resistance and that behave in a similar manner are titanium, tantalum and niobium. But when these metals are used in electrochemical processes, they behave as valve metals.

Prior attempts have been made to utilize titanium in the grids of lead-acid battery systems. When titanium is used as a positive grid in lead-acid battery systems, its surface becomes oxidized to form titanium dioxide. Unfortunately, this oxide layer is a semi-conductor and will only conduct electricity in one direction through its surface. As a result, a battery with a pure titanium positive grid cannot be charged. When titanium is used as the negative grid in lead-acid battery systems, it corrodes. This fact thereby effectively precludes the use of titanium per se in a negative battery grid. In general, the same problem will be found in the case of positive grids made from tantalum or niobium.

To prevent the formation of titanium oxide at the surface of titanium electrodes that are polarized positively in acid solutions, the prior art has used inert metallic layers on the electrode surface. When constructing a battery, the active material is pasted on the coated titanium grid. Past experience has found that the active material fails to adhere to the coating of inert metal, because there is essentially no chemical bonding between the inert metal layer and the active material.

Other prior art attempts to solve the problem of connecting active material to a titanium electrode structure include one using a three-layer base having a titanium layer on the inside, a relatively inert material layer, and a layer of lead of contact with the active mass or the electrolyte, depending upon its use. The inert material could be in the form of titanium carbide, titanium silicide, or gold or other metals such as nickel. However, structures made in this fashion fail when the outer lead layer becomes oxidized, thereby exposing the middle layer to the electrolyte. The active material then begins to shed.

SUMMARY OF THE INVENTION

Generally speaking, the present invention comprises an article of manufacture, at least one surface of which is adapted in use, to be exposed to an electrolyte, particularly an aqueous acidic electrolyte and, at least part of the time is at a potential capable of discharging an oxidized product from said electrolyte. The portion of the article exposed in use to the electrolyte comprises a matrix of an anodically passivatable metal having a maze of tortuous paths (or pores) therein communicating with the surface of the article, which are filled, in the volume adjacent the surface exposed to the electrolyte, with an electroconductive oxide insoluble in said electrolyte. The electroconductive oxide is confined by the anodically passivatable metal walls of the paths, blocks entry of electrolyte into the paths of the matrix and shields the interior of the matrix from contact with the electrolyte. Advantageously, the anodically passivatable metal is selected from the group of primary valve metals so as to provide general utility with acidic electrolytes. Advantageously also, the paths in the interior volume of the matrix are interconnected and are filled with metal from the group lead, tin, antimony and alloys thereof. When such metal is present there is physical contact between the metal in the path and the electroconductive oxide to provide a ready path of electronic conductivity between these two materials.

In accordance with a preferred embodiment, a composite electrode is disclosed herein having a structural electrode member with at least a portion of the volume thereof adjacent one surface of the electrode member constructed from an electrochemical valve metal, a metal having an electroconductive oxidic product, and the electroconductive oxidic product of the metal at the electrode surface, such that an electric current path is provided by the electroconductive oxide through the oxidized surface of the valve metal. The electrochemical valve metal, such as titanium, is in the form of a continuous matrix having a maze of tortuous paths communicating with the surface of the electrode member. The volume of the tortuous paths extending from the oxidic product at the surface of the electrode member which would be exposed to the electrolyte, is filled with filling metal, such as lead, tin, antimony, and mixtures thereof. The filling metal is confined by the path walls, and may fill each path to varying degrees. Electroconductive filling metal at the outside surface of each path prevents entry of electrolyte all of the way into the paths of the matrix metal. As a result, the interior of the matrix does not come into contact with the electrolyte and will not oxidize to prevent bi-directional current flow. Furthermore, the matrix metal resists the acid and continues to provide the structural strength and current carrying capacity necessary for the electrode.

Depending on the performance required for a particular composite electrode, other materials may be used to reduce the amount of matrix and filling metals required for the structural electrode member or to reduce overall weight. In fact, even a hollow core may be used in certain applications.

The composite electrode has application in at least two electrochemical areas: lead-acid electric storage batteries and electrowinning. In the electric storage battery area, it can be used as a grid for both flat plate (Faure type) and tubular plate batteries, as well as the diaphragm layer in a bipolar battery.

In the electrowinning and other electrochemical areas, the composite electrode can be used in its basic form or with particular cores, coatings and other variations in construction as the positive electrode.

Composite electrodes constructed in the manner disclosed above offer many advantages over that available in the prior art. In storage battery systems, great advantage is derived from the reduction in weight possible by using titanium in place of lead for most of the grid material. Increased energy density of the battery greatly increases the feasibility of electric vehicle use and improves the performances of those batteries which are already available for use in golf carts and other electric vehicles. Since most of the composite electrode is corrosion resistant and no layer of a material is used which is chemically different from the material pasted on the grid, grid life is increased and shedding of the active material from the grid itself is effectively reduced. The end result is a lighter electric storage battery which is much more reliable and has a longer useful life than prior art battery systems.

Use of the composite electrode in industrial electrochemical processes gives improved results as well as decreased anode costs.

A better understanding of the invention and its advantages can be seen in the following description of the figures and the preferred embodiments.

DESCRIPTION OF THE DRAWINGS AND PREFERRED EMBODIMENTS

THE BASIC COMPOSITE ELECTRODE

Figure 1:
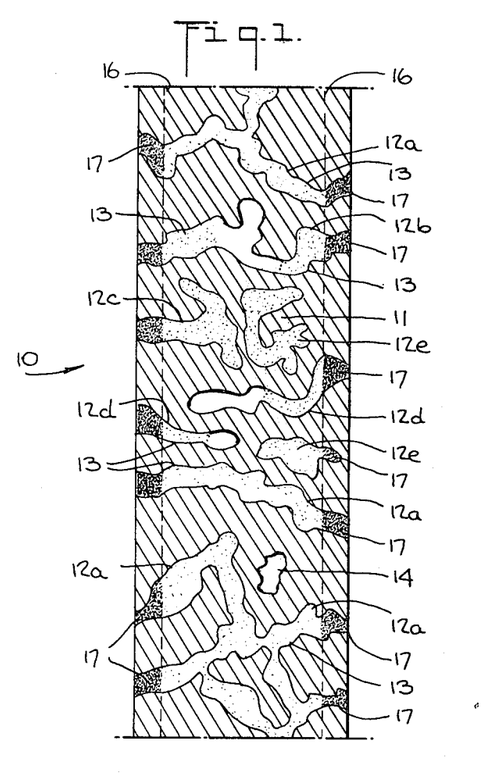
FIG. 1 is a diagrammatic illustration of a portion of the cross-section of a composite electrode.
Figure 3:
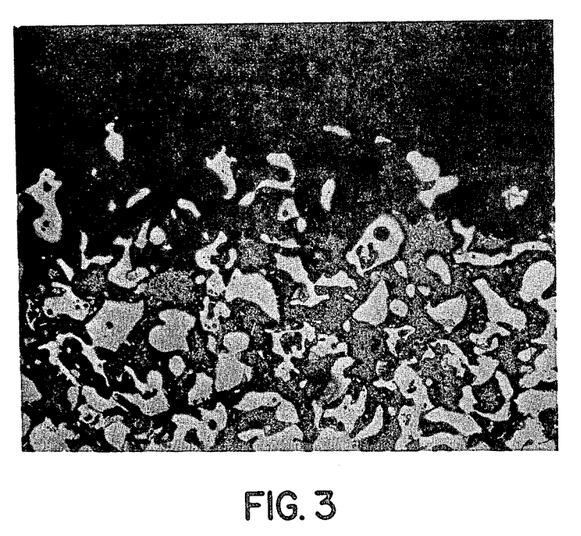
FIG. 3 is a reproduction of an optical photomicrograph showing at 200X magnification, a portion of the cross-section of an actual composite electrode.

The basic composite electrode is illustrated in diagrammatic form in FIG. 1. The relative size of the paths, as compared to the thickness of the electrode, is exaggerated for purposes of illustration. It should also be noted that the paths in the electrode may be much more tortuous than shown in FIG. 1 and that the actual cross-section of the electrode may not exhibit the continuity implied in FIG. 1, as can be seen in FIG. 3.

More specifically, composite electrode 10 is formed by a matrix metal treated to form matrix structure 11 which has paths 12 passing throughout to form a matrix-like configuration. Paths 12 may take many varied shapes and sizes, as shown in FIGS. 1 and 3. Paths 12a and 12b are shown to pass completely through matrix 11. Paths 12c and 12d are all shown to penetrate matrix 11 a distance less than the thickness of matrix 11. Paths 12 of matrix structure 11 are filled with infiltrating metal 13. The percentage of each path 12 that is filled can vary depending on the shape of a particular path as well as the infiltrating process provided that the outer reaches of the paths are essentially completely filled. For example, paths 12a & 12c may be completely filled with infiltrating metal 13, as shown in FIG. 1. Whereas paths 12b and 12d may be only partially filled with metal 13. When forming matrix structure 11, other paths can be formed which do not terminate at the electrode surface, such as void 14. Obviously, these voids cannot be filled with infiltrating metal 13. Some paths which are infiltrated, but are not shown to connect to the electrode surface, such as 12e, are connected to the electrode surface through paths not appearing in the plane through which the section for the figures was taken.

Figure 2:
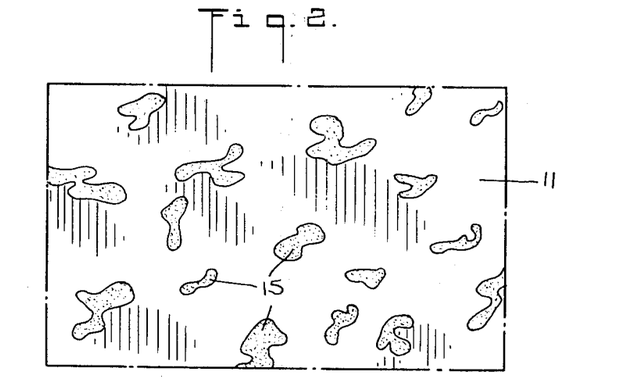
FIG. 2 is a diagrammatic illustration of a portion of the surface of a composite electrode.

A volume 17 of an oxide of the electroconductive infiltrating metal is formed at the surface of each infiltrated path to a predetermined depth. If the infiltrating metal is lead, the oxide would then be lead dioxide. The outside surface of oxide volume 17 forms conducting islands 15 on the composite electrode surface at the point paths 12 initiate, as shown in FIG. 2. These islands serve to permit conduction of current between the electrode and the electrolyte so that the effect of the electrochemical valve action of the matrix metal is circumvented. Another advantage is that greater bonding between a composite electrode used as a battery grid and the active material is possible, because of the chemical similarity of the active material and the infiltrating metal.

The composite electrode should be fabricated in such a manner that the cross sectional size of paths compared to the overall electrode thickness will permit the volume of infiltrating metal 13 at the surface of composite electrode 10, to oxidize, expand and become securely locked within the paths. This expansion process at the electrode surface acts to prevent passage of electrolyte further into paths 12, so that oxidizing of the matrix metal bordering paths 12 and the infiltrating metal is limited.

The distance into each path 12 the infiltrating metal oxidizes is affected by the contact of the electrolyte with the infiltrating metal and the potential difference across the interface of the infiltrating metal and its oxide (for example: $Pb/PbO_2$). When an infiltrated matrix is first immersed in an oxygen-containing electrolyte and connected as an anode in with the chosen electrochemical process, the outside surface of the infiltrating metal starts to oxidize because of its contact with the electrolyte and the potential difference being place across it. It is our belief that, gradually, the metal oxide formed swells within the path to limit the inward flow of electrolyte and to increase internal resistance between the electrolyte/metal oxide interface and the metal oxide/metal interface. Eventually, the rate of penetration of oxide decreases and stops at a maximum depth (in part determined by average pore diameter) when the resistance in the pore has increased a sufficient amount to drop the potential across the metal-oxide interface below that level which will cause further oxidation of the infiltrating metal.

Failure to stop the oxidation process at some point in paths 12 defeats the whole purpose of this invention. If the matrix metal surrounding each path 12 oxidizes, the electrochemical valve action of the matrix metal would then predominate. Line 16 (shown in phantom) in FIG. 1 approximates the maximum depth to which the oxidation of infiltrating metal 13 will take place. As long as infiltrating metal 13 has filled path 12 to a depth below that indicated by line 16, a current path is provided between island 15, through infiltrating metal 13 to the interior of matrix structure 11.

The electric current path through the composite electrode 10 depends upon the manner in which the potential difference is placed across the electrode for the particular process in which it is being utilized. Should the potential difference be placed across the two lateral sides of the electrode, electric current will flow through the path of least resistance, which will likely be through the paths which are directly communicating with both sides, such as path 12a. In addition, some current will flow through those paths which do not pass directly through the electrode structure. For example, current may flow into path 12b through the interior of matrix structure 11 and out through path 12c.

Should the potential difference be placed across composite electrode 10 such that current flows between the sides of the electrode and the top portion, the current flow path will be into the interior of matrix structure 11 by means of the various paths 12, and upward through the top of the electrode through the interior of matrix structure 11 and those infiltrated paths along the way.

This composite electrode design provides the advantages of allowing matrix structure 11 to be constructed from a light, yet structurally sound material, and to permit the current to be carried by both the infiltrating metal and the matrix metal. Another advantage to this composite electrode is that various coatings can be applied to the outside electrode surface using materials that are chemically similar to the oxide of the infiltrating metal to obtain better adhesion than that which would be obtained between the coating materials and the matrix metal itself. This coating material could be in the form of active material pasted on the composite electrode for use in batteries, or a protective layer to facilitate use in an electrowinning process.

Figure 4:
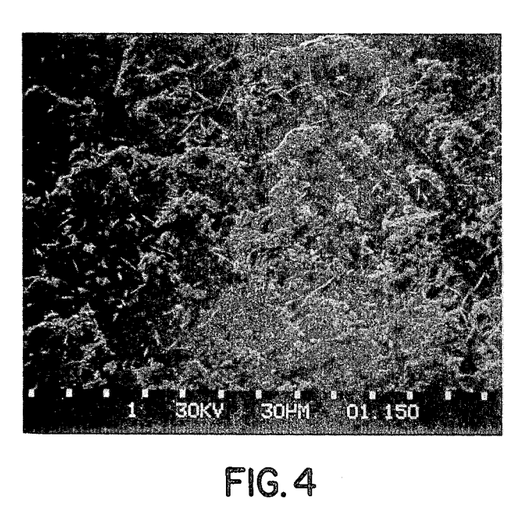
FIG. 4 is a reproduction of a scanning electron photomicrograph showing a 300X magnification, a portion of the surface of an actual composite electrode.

In order to provide a more realistic illustration of the composite structural electrode member of this invention, a reproduction of an actual optical photomicrograph of a cross-section of the sample electrode is shown in FIG. 3, at 200× magnification. The sample of FIG. 3 has a matrix of titanium with 58 volume percent lead as the infiltrating metal. This electrode has been immersed in aqueous sulfuric acid solution and subjected to anodic action for 96 days. Microprobe analysis of the phases shown in FIG. 3 indicates that the dark scale, about 130 microns thick at the surface, is lead dioxide, the white particles are titanium and the gray matrix is lead. FIG. 4 is a reproduction of a photomicrograph of a portion of the side of a composite structural electrode member of the present invention showing lead oxide islands on the titanium matrix surface at 300× magnification. The structural electrode member shown in FIG. 4 containing about 17 volume percent lead in a titanium matrix, exhibits irregularly shaped lead oxide islands on the surface which vary in major dimension from about 10 microns to about 120 microns.

No preferred ratio of the length of paths 12 to their average cross-sectional area can be accurately stated since each through-path in actuality is a combination of many different paths that are formed around the many separate and combined entities of the matrix metal. However, the total volume of the paths preferably comprises from about 10% to about 60% of the combined matrix structure and path volumes.

More detailed analytical information is provided below on the composite electrode, under the heading "Manufacturing Methods".

Lead-Acid Storage Battery Applications

The composite structural electrode member can be easily used as a grid or as part of a grid, for lead-acid electric storage batteries, especially the Faure type. The low density and the high current carrying capacity characteristics of the composite electrode member enable it to be used in many battery applications. When used as the grid for the positive plate in a lead-acid storage battery, the advantages of corrosion resistance and reduced weight increase battery life by substantially reducing structural grid corrosion and improving the energy density. While the corrosion problem at the negative plate is not as severe as that at the positive plate, advantages resulting from reducing the weight of the negative grid can be obtained by using the fundamental principles of the composite electrode member. When as described in copending U.S. patent application Ser. No. 850,271, filed Nov. 10, 1977 now U.S. Pat. No. 4,121,024 a structure akin to the composite electrode member of the present invention is used for the negative grid, a protective layer (for example: Pb) is required to prevent contact of the electrolyte with the matrix metal and its resulting dissolution. It also should be noted that it is not necessary to use the basic concept of the present invention for both the negative and positive grids. For instance, depending upon the particular requirements or limitations regarding power, size, weight, cost, etc., the positive grid may be made from the composite electrode and the negative grid made in a conventional fashion or from other metals or conductive materials.

A lead-acid battery using the structural electrode member for positive grids is constructed in a fashion very similar to that used on conventional lead-acid batteries. The positive composite grid advantageously provided with either a roughened surface or a surface having lead grains or whiskers fixed thereon is pasted with active material (lead oxides) to provide a plate. The plates are then electrolytically formed either inside the battery or before assembly into the battery casing. This process causes the lead oxides on the positive plate to oxidize to lead dioxide. The battery is now fully charged. During discharge, the active materials on both the positive and negative plates react with the electrolyte and change to lead sulfate ($PbSO_4$). The amount of active material on the negative plate should be more than is necessary for normal operation of the battery so that an extra safety margin is provided to prevent lead coating of a composite negative grid from becoming sulfated, thereby permitting the grid to come in contact with the electrolyte.

Figure 5:
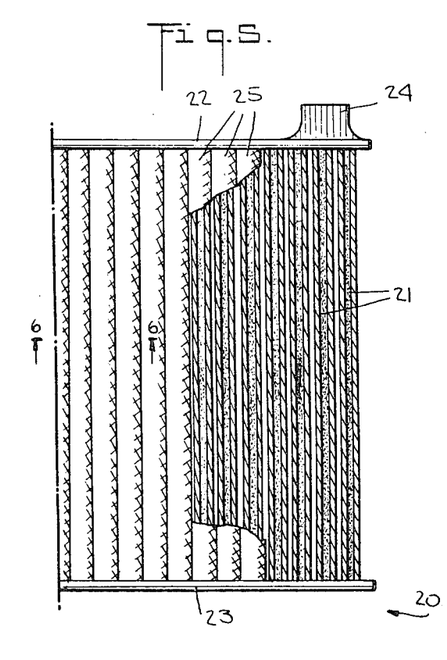
FIG. 5 is an external view of a plate from a tubular type lead-acid electric storage battery, with part of the tubes and active material removed to reveal the spine grid.
Figure 6:
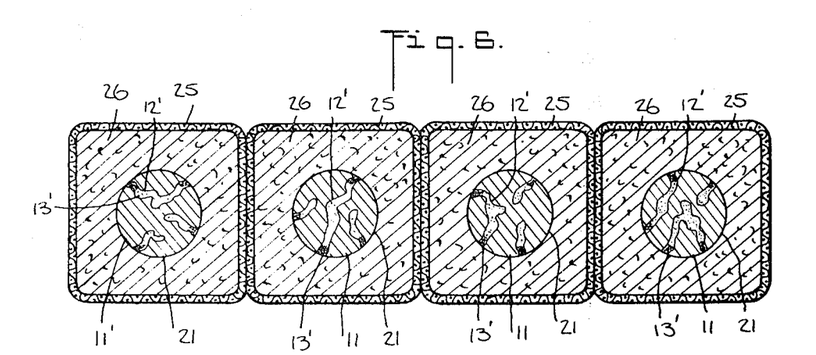
FIG. 6 is a diagrammatic section along line 6—6 in FIG. 5.

Lead-acid storage batteries have many sizes and shapes and utilize many different plate and grid structures. One common battery is the tubular battery, which derives its name from the plate design which uses a plurality of conductive lead alloy spines in porous tubes filled with active material lying side by side and connected together on each end to form a plate. This plate design is sometimes known as the IRONCLAD plate, a product of ESB Incorporated. An illustration of a tubular battery plate is shown in FIGS. 5 & 6, wherein tubular grid 20 includes plurality of conducting spines 21 secured on either end to top bar 22 and lower bar 23. Lug 24 extends from top bar 22 to provide a point of connection for interconnecting the various plates of the battery. An elongated, porous tube 25 surrounds each spine 21 and confines active material 26 in the annular space between spines 21 and the inside of tube 25. (See FIG. 6). Conducting spine 21 and connecting bars 22 and 23 can all be made in the same manner as the composite electrode. A diagrammatic illustration of the infiltrated paths location in spine 21 is shown in FIG. 6 with similar elements bearing prime designations. Again, the paths 12 are shown diagrammatically for purposes of illustration.

In the tubular battery, ionic current flow takes place through porous tube 25, through active material 26 and into the grid. Electronic current flow then proceeds in the grid through infiltrating metal 13', through matrix 11', and finally out through lug 24 to the battery terminal.

Figure 7:
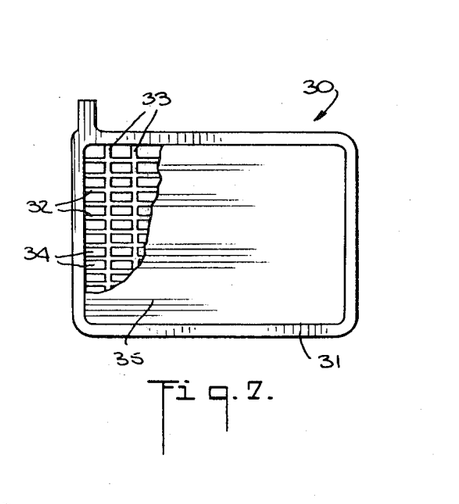
FIG. 7 is an external view of a plate from a flatplate lead-acid electric storage battery, with part of the active material removed to reveal the grid.

A second popular type of lead acid-battery which can utilize the composite electrode of the present invention is the basic flat plate battery. A typical flat grid which is used for this battery is shown in FIG. 7, in which grid 30 has an external frame 31 with horizontal conductors 32 and vertical conductors 33 extending between the sides of grid frame 31 to define openings 34. Active material 35 is pasted on the grid during construction of the battery and secured in openings 34. The electrochemical functions which take place are the same as these discussed above.

These composite electrodes which serve as battery grids are constructed by forming the matrix metal into the appropriate grid shape and then infiltrating the paths of the matrix metal with the infiltrating metal. Alternatively, one can form a flat, infiltrated sheet of matrix metal and then either stamp battery grids from the sheet or shear the sheet into strips which are then constructed into grids. The specific details are discussed below under manufacturing methods.

A third battery design is that known as the bipolar battery which utilizes electrodes (or grids) which have positive active material on one side and negative active material on the other side. In this application, the electrodes serve as a diaphragm or barrier to separate the electrolytes in different battery cells, but permit electronic current flow between the positive and negative active material disposed on either side of the electrode.

Figure 8:
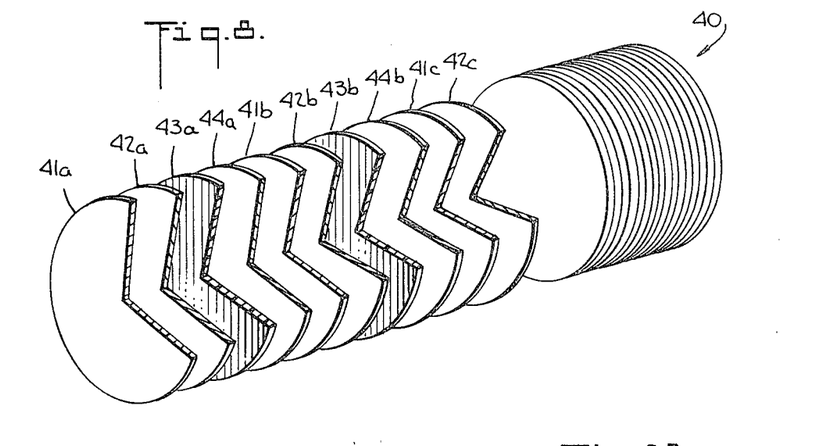
FIG. 8 is an exploded view of a "pile" type bipolar battery with a circular cross-section, having a portion of the casing removed to reveal the bipolar battery elements.

A fundamental bipolar battery design is shown in FIG. 8. This bipolar battery has a cylindrical shape and is known as the "pile type". The pile-type battery 40 is assembled to have, in sequential order, electrode 41a, positive active material 42a secured to electrode 41a, separator 43a, negative material 44a secured to one side of electrode 41a, positive active material secured to the other side of electrode 41b, et seq. This type of battery has several advantages, including low internal resistance, light weight, and easy assembly. To assemble the battery, the various components can be piled together in the cylindrical casing and then sealed to the internal wall of the casing.

Figure 9:
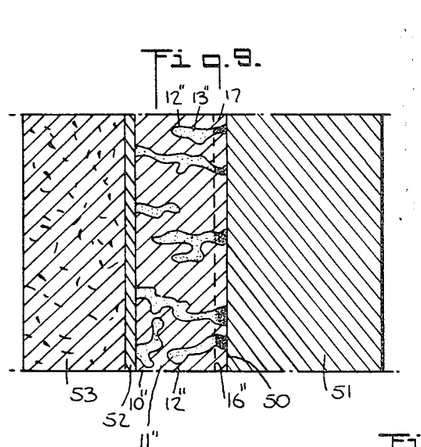
FIG. 9 is a portion of a diagrammatic cross-section of the composite electrode with active material, and a lead impermeable barrier for use in a bipolar battery.

A bipolar battery element 50, having an electrode with positive and negative active material and utilizing the composite electrode is shown in FIG. 9, wherein the elements like those shown in FIG. 1 bear the same numeral with a double prime designation. Composite electrode 10" is basically the same as that in FIG. 1, having matrix structure 11" with its path 12" filled by infiltrating metal 13". The positive active material 51 is secured directly to one side of electrode 10". However, as discussed above, a thin electrolyte protective layer 52 is required on the negative side of the electrode to prevent dissolution of the matrix metal by the electrolyte. In the lead-acid bipolar battery, a protective layer would preferably be lead. The negative active material 53 is then secured directly to the lead protective layer.

In use, the composite structural electrode provides an impermeable barrier to the flow of electrolyte between the battery cells, but permits the flow of electrons from positive active material 51, through electrode 10" and protective layer 52, to negative active material 53.

Figure 10:
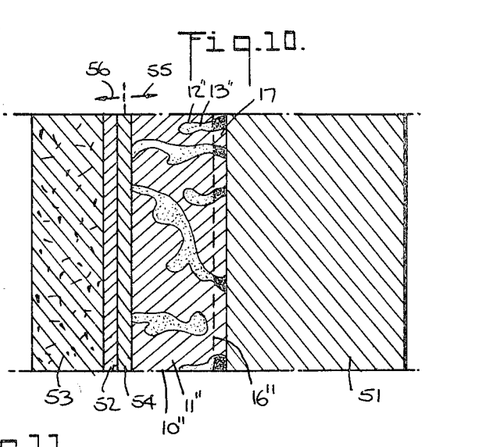
FIG. 10 shows a variation of the composite electrode of FIG. 9 in which a layer of matrix metal is used to prevent shorts from occurring through the electrode.
Figure 11:
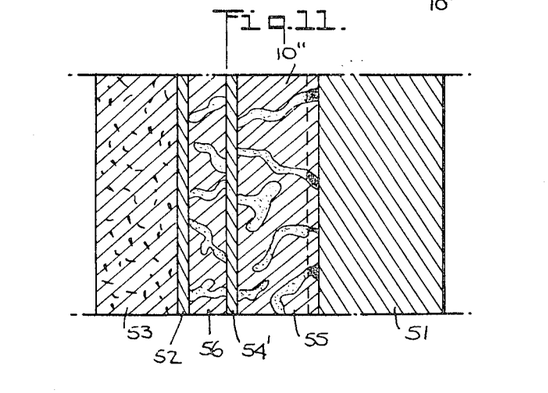
FIG. 11 shows a variation of the composite electrode of FIG. 10 wherein the matrix metal layer is located inside the infiltrated matrix portion.

Another variation of the bipolar battery application is to utilize a solid corrosion barrier layer of matrix metal 54 to prevent corrosion of infiltrating metal 13 completely through the composite electrode. This is especially important because electrode 10" must be quite thin for use in bipolar batteries, sometimes as thin as 1-2 mm. In FIG. 10, corrosion barrier layer 54 is between protective layer 52 and composite electrode 10". To minimize adhesion problems between protective layer 52 and barrier layer 54, layer 54 is located in the center portion of electrode 10", as shown in FIG. 11. Protective layer 52 can then adhere better to infiltrating metal 13" than the matrix metal. Preferably, barrier layer 54' is located closer to the negative side of electrode 10" than the positive side, so that positive section 55 is thicker than the negative section 56. This difference in thickness is required to provide a sufficient margin beyond the expected oxidation of infiltrating metal 13". However, only a thin section (compared to positive section 55) is necessary for section 56 to provide the required surface of adhesion of protective layer 52. The optimum relation between the thicknesses of section 55 and 56 would be 2 to 1.

While the above examples have been given with the assumption that the composite electrode used would be in a solid form, it can be appreciated that for further weight reductions, if current capacity requirements can be met, a core of a different metal in the interior of the composite electrode can be used to further reduce the weight of the electrode. Copper, aluminum, iron or the like would be good examples of possible core materials. In certain instances, except for bipolar elements, where extremely light weight batteries are required, the core of the electrode structure can be hollow.

Figure 12:
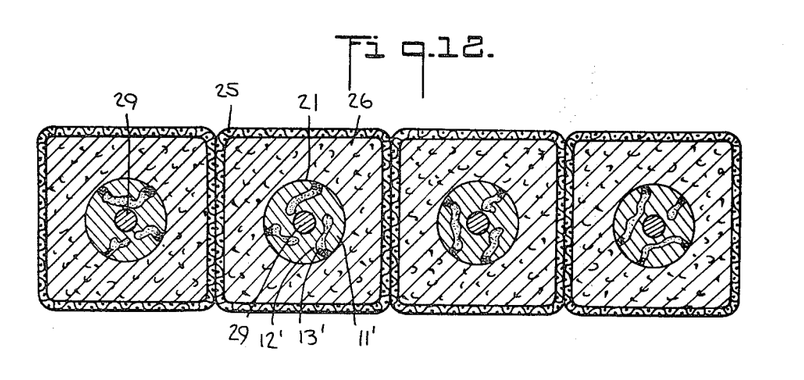
FIG. 12 is a diagrammatic cross-section through part of a tubular-type battery plate in which the composite electrode has a core made from a third metal.

One possible application of this variation would be in the tubular type battery, as shown in FIG. 12. In this embodiment, spine 21 has a core metal 29 passing through its center along its longitudinal axis. The other elements can be the same as that shown in FIGS. 5 & 6, and are identified by the same numerals with prime designations.

Although the above-noted battery applications have been provided as examples, it will be appreciated that there are many other possible battery systems which may use the composite electrode.

ANODES FOR ELECTROCHEMICAL USAGE

The articles of manufacture of the present invention are readily adapted for use as anodes and, when metallurgically bonded to a suitable material, as bi-polar electrodes in various electrochemical systems. Among those systems wherein the articles of the present invention can be used are known systems for the electrowinning of hydrogen, oxygen and metals such as copper, cobalt, manganese, iron, and zinc, chromium electrodeposition from electrolytes containing ions of these metals, processes involving electrolytes containing halide ions such as chlorine production, hypochlorite production, chlorate production, perchlorate production and other processes such as hydrogen peroxide production, perborate production, manganese dioxide production and cathodic production of metallic structures. In addition to the foregoing electrochemical systems which comprise at least an anode, a cathode and an electrolyte and in which products are usually formed at or near the anode or cathode, anodes of the present invention can be used in electrochemical systems wherein migration of charged particles results in the formation of a product. Examples of such processes include electrophoresis and electrodeionization of electrolytes (e.g., desalination of sea water). In each of these systems the article of manufacture, suitably shaped and fitted with standard electrical connectors can be used per se. In the electrowinning of metals such as copper, nickel, cobalt, zinc and the like, the anode is usually standardized as a sheet about 3 to 6 millimeters (mm) thick and about 1 meter square. This anode is normally fitted with bus bar connectors at the top and hangs in the electrolytic bath suspended from the bus bar connectors. As is well known, the electrowinning electrolyte (electrolytic bath) is normally contained in rectangular tubs. Up to about 20 or so each of anodes and cathodes alternating, are suspended in these tubs spaced apart by a distance of about 1 to 3 centimeters (cm).

Figure 13:
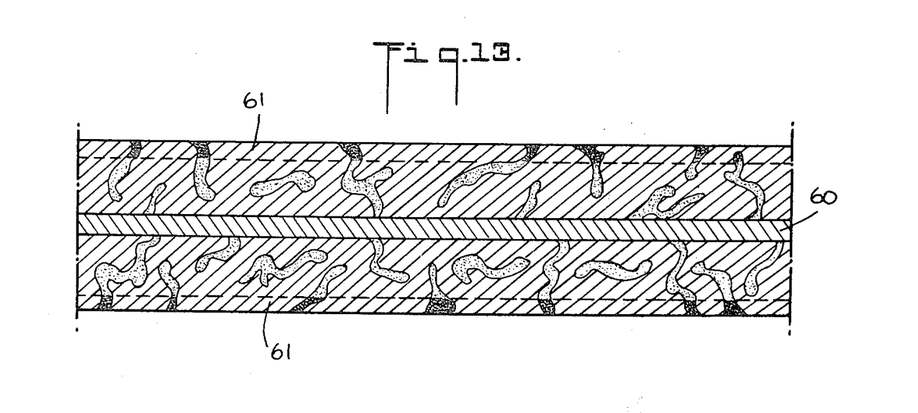
FIG. 13 is a diagrammatic cross-section of composite electrode structures for use as an electrowinning electrode.

Either the cathodes or the anodes may be bagged (or encased in a porous compartment) and, often, means are provided for introducing pregnant electrolyte into the volumes immediately surrounding the cathodes. Anode structures of the present invention are useful directly in such systems in replacement of prior art anodes. Referring now to FIG. 13 of the drawing, a useful variation of an electrowinning anode comprises an inner layer 60 of highly electrically conductive metal such as copper and outer encasing layers 61 of filled titanium matrix having oxide in pores adjacent surfaces exposed to electrolyte. It is important that encasing layers 61 completely shield inner layer 60 in the embodiment of FIG. 13 because any exposure of inner layer 60 to an electrowinning electrolyte will result in rapid failure of the anode and contamination of the electrowinning electrolyte if it is an electrolyte containing a metal other than that of the inner layer. While FIG. 13 of the drawing is representative of sheet-like electrowinning anodes used for metals, it will be appreciated that the composite structure anodes of the present invention can also be in other forms, for example, tubes, bars, rods, etc.

In some instances, particularly where a gaseous cathodic product (e.g., hydrogen) or a water-soluble cathodic product (e.g., sodium hydroxide) is to be formed, the anode structure of the present invention can be formed as part of a bi-polar electrode. In such a case, the structure is indistinguishable from those depicted in FIGS. 9 to 11 except that layer 52 can be made of a metal other than lead and active masses 51 and 53 are not present. It is to be noted that while most electrochemical processes carried out on an industrial scale are carried out using aqueous electrolytes, anode structures of the present invention are also adapted to be employed in non-aqueous electrolytes such as organic-based electrolytes, liquid ammonia-based electrolytes and low-melting point fused salt-based electrolytes.

MANUFACTURING METHODS

The articles of manufacture of the present invention, i.e., structural electrode members are advantageously made by a three-step process which involves (A) formation of a sintered, porous body composed of a valve metal or an anodically passivatable metal, e.g., titanium;

(B) infiltration of that sintered porous body with a metal from the group of lead, tin, antimony and alloys thereof; and (C) oxidizing the metal from said group in at least part of the external regions of the infiltrated, sintered body to provide an electroconductive oxide layer.

Taking each of these steps in turn, the sintered porous titanium body is preferably formed by metallurgical methods from essentially pure titanium powder made by crushing the titanium sponge of commerce. When desired, alloying additions may be made by blending or mechanically alloying other metal powder with the pure titanium powder. The powder is then formed into a body of the shape and essentially the size required in the particular articles being made. For example, for simple shapes such as rods or bars, the titanium powder is subjected to piston compression in a closed die under pressure of about 140 to about 7,000 kilograms per square centimeter ($Kg/cm^2$). Isostatic pressure means can be applied to form more complex shapes. In other instances green compacts (i.e., those which are shaped but not sintered) can be made by slip casting techniques or by almost any other of the well known shaping techniques available to powder metallurgists. Those skilled in the art will appreciate that it is not necessary to provide the final shape of the desired object purely by forming the powdered metal to that shape. As mentioned hereinbefore, electrode structures for lead-acid battery plates can be made by assembling parts which have been sheared from composite sheets. Other such examples will be obvious to those of normal skill in the art upon inspection of the desired structural shape.

In preparing green compacts for purposes of the present invention, it is highly advantageous to use essentially pure titanium powder as obtained by crushing sponge not only because of the advantageous electrochemical characteristics of pure titanium but also because green compacts made with this powder exhibit advantageous handling characteristics even when formed under little or no pressure. The resultant green compact is then sintered in an inert atmosphere (e.g., dry argon) at a temperature of about 900° C. to 1100° C. for about 15 to about 240 minutes, advantageously for about one hour. As those skilled in the art are aware, sintering times and temperatures can vary somewhat depending in part upon the morphology of the powder particles and amount of energy contained therein. Generally, sintering will be acceptable when carried out at temperatures at least as great as 980° C. for at least 15 minutes and will produce void volumes in the range of about 5% to 58%. Table I sets forth the volume per cent porosity which has been observed in sintered compacts of titanium initially formed under the indicated pressure.

TABLE I

| Compacting Pressure ($Kg/cm^2$) | Volume % Voids |
| --- | --- |
| 0 (Loose Powder) | 58.6 |
| 140.6 | 39.1 |
| 281.2 | 37.4 |
| 562.4 | 34.7 |
| 843.6 | 31.6 |
| 1125 | 29.1 |
| 1400 | 25.6 |
| 2812 | 18.3 |
| 3500 | 17.2 |
| 4218 | 15.3 |

TABLE I-continued

| Compacting Pressure (Kg/cm$^2$) | Volume % Voids |
|---|---|
| 4920 | 11.3 |

The general size of the voids depends on the size of the titanium metal particles and the degree with which those particles are compacted. Usually, the paths forming the maze of pores in the sintered titanium compact are of such size that capillary attraction functions during the subsequent infiltration step. When strip is made by powder rolling and sintering it is usual to have a sintered product having about 25 volume percent porosity.

After sintering the compacts are then infiltrated with a metal from the group of lead, tin, antimony and the like. The sintered compacts having the void (path) volumes as set forth in Table I were infiltrated with lead by immersion in a lead bath at a temperature of about 350° C. to 700° C. for about 6 to about 300 minutes to substantially completely fill the paths with lead. For example, infiltration is successfully carried out in a little more than 5 minutes at 550° C. and somewhat more than an hour at 450° C. Upon completion of infiltration excess infiltrating metal is removed from the surface of the sintered structure. The volume percent of lead in the sintered, infiltrated compacts varied from 55% in the compact containing 58.6% pores to 10% in the compact containing 11.3% pores.

The electroconductive oxide layer in the paths in the continuous matrix of titanium is advantageously generated by electrolytic action in an acidic electrolyte, for example, in aqueous sulfuric acid solution. For example, lead infiltrated sintered titanium compacts can be provided with the necessary layer of electroconductive lead dioxide by exposure as an anode to aqueous sulfuric acid at an anode current density of about 2 or more milli-amperes per square centimeter (mA/cm$^2$) and under oxygen evolution conditions for times in excess of one hour. Normally, when used as supporting members in lead-acid battery positive electrodes, the required PbO$_2$ layer will develop automatically during use. It is to be observed that in some instances initial exposure as an anode will result in a small amount of lead dioxide being injected into the electrolyte from the extreme surface ends of the paths in the titanium matrix. This effect is minor. The tortuosity of the paths and the expansion of the material in the paths due to oxidation results in a very rapid plugging of the paths to prevent entry of electrolyte. Once this occurs, oxidation proceeds internally only by ion transport in the solid PbO$_2$ and ceases when the potential at the oxide-metal (e.g., PbO$_2$-Pb) interface reaches the limiting value at which metal oxidation will occur. Results to date in anodic tests in battery acid with one sample having 51 volume percent pure lead and another sample having 17.5 volume percent lead, 0.5% tin alloy indicated slowing of oxygen penetration rate at 7.5 mils in 64 days and about 2-3 mils in 128 days, respectively.

As those skilled in the art will recognize, alternate means of producing the articles of manufacture of the present invention can be employed. For example, porous sheets of green compacted titanium can be formed by powder rolling, with or without, a solid metal backing. Infiltration can be accomplished not only by immersion in liquid metal (e.g., lead, tin, etc.) but also by exposure to vapors or solutions of materials which will thermally decompose to form metallic deposits or deposits reducible or chemically changeable to metal of the group of lead, tin, etc. Examples of such thermally decomposible materials are tetraethyl lead, tetramethyl lead, hexaethyldilead, stannane, diethylin, dimethylethyl-propyltin, triethylantimony, etc. It will be appreciated however, that use of such non-metallic infiltrants must be carried out to the extreme if the porous titanium matrix is to be completely filled with metal. It is possible however, and may in certain cases be advantageous, to combine in filtration by non-metallic species and thermal decomposition thereof with subsequent chemical treatment and/or metallic infiltration. For example, in the case of a compacted and sintered porous body of matrix metal which is not wetted by a molten infiltrating metal, e.g., aluminum as the matrix metal and lead as the infiltrating metal, infiltration can be facilitated by thermal decomposition within the pores of the matrix to deposit a metal, such as copper which is wetted by molten lead. Chemical formation of part of the electroconductive oxide layer is also possible but subsequent chemical or electrochemical oxidation of lead, tin or antimony or other infiltrating metal in situ in the pores of the titanium matrix is believed necessary in order to develop the blocking of the paths to prevent electrolyte entry. For example, lead peroxide can be formed chemically in the pores of a titanium matrix by hydrolysis of chloroplumbic acid, lead tetra-acetate, lead tetrachloride, etc., and ignition of lead nitrate. SnO$_2$ can be chemically deposited by decomposition of stannous carbonate, stannous sulfate, polystannic acids, etc. Antimony pentoxide can also be deposited for example, by oxidation of antimony trioxide or thermal decomposition of antimonic acid.

Speaking specifically with regard to anodes of the present invention for use in electrochemical processes, it can be advantageous to provide, in the electroconductive oxide material at least partially filling the paths in the titanium matrix, materials which can act as catalysts or dopants in the oxide structure. When, as is advantageous, the electrode structure of the present invention is made by infiltration of molten metal into the pores of a pressed and sintered titanium compact, the molten lead, tin or antimony or alloy thereof can contain dopants and catalysts such as manganese, platinum, palladium, rhodium, cobalt, nickel and the like in small amounts, for example, up to 2% or more by weight. When the infiltrated metal is electrochemically oxidized the dopants and catalysts will form metallic or oxidic species in situ in the electroconductive oxide crystal structure. Such metallic or oxidic species can also be modified by chemical action of the electrolyte in which the electroconductive oxide is formed. Iridium and ruthenium which at times, either alone or in association with manganese, are employed in conventional permanent, titanium-base anodes can be applied as compounds in aqueous solution to the surface of the formed anode of the present invention and the coated anode can then be subjected to diffusing heat treatment.

Infiltrated porous sintered composites other than lead infiltrated titanium can be made and used, after oxide formation, as anodes in electrochemical processes. Since an anode for electroprocessing purposes has no requirement of electrical reversibility, any matrix metal which will anodically polarize in a particular electrolyte can be employed. Aluminum can be used in certain instances with advantage as the matrix metal because of low sintering temperatures and light weight. With matrix metals having a high melting point, e.g., above about 1500° C. or even about 1700° C., manganese or manganese rich alloys can be used as the infiltrating metal which upon anodic oxidation will form an electroconductive oxide approaching the composition of $MnO_2$. For example, a porous sintered tantalum body can be infiltrated with manganese under an inert atmosphere at a temperature of about 1360° C. Similar to the situation where lead, tin, antimony or alloys thereof are used as infiltrants, the manganese as infiltrated can contain modifiers and/or dopants or such materials can be introduced into the oxide exposed in the matrix pores after anodic oxidation.

In general, when the infiltration technique is used to form the precursor of the structure of the present invention, the matrix metal must have a melting point significantly higher than the melting point of the infiltrating metal and the conditions of infiltration must ensure that the infiltrating metal wets the matrix metal. It can be advantageous for the infiltrating metal to contain small amounts of highly active ingredients such as calcium, boron, mischmetal or the like to assist in reducing any matrix metal oxide which may exist in the pore structure of the sintered matrix metal and thus facilitate wetting of the matrix metal.

For some purposes of electrochemical anodic use as well as for bi-polar battery use it is necessary to provide sheet-form anodes. Table II sets forth some mechanical characteristics of sheet-form composites having a matrix of titanium sintered at about 980° C. for 1 hour in an argon atmosphere and thereafter infiltrated with a melt containing 0.5% tin, balance lead at 550° C. for 1 hour.

TABLE II

| Vol % Ti | Vol % Infiltrant | Vol % Pores | Y. S. Kg/Cm$^2$ | UTS Kg/Cm$^2$ | Elong % in 2.54cm |
|---|---|---|---|---|---|
| 84.24 | 12.84 | 2.93 | 2094 | 2924 | 2.0 |
| 83.10 | 12.72 | 4.16 | 2195 | 2700 | 2.0 |
| 83.05 | 13.68 | 3.26 | 2108 | 2632 | 3.0 |
| 75.70 | 20.92 | 3.39 | 1761 | 2203 | 3.0 |
| 75.54 | 23.39 | 1.08 | 1693 | 2224 | 2.0 |
| 67.98 | 28.66 | 3.36 | 1353 | 1748 | 2.0 |
| 69.04 | 27.43 | 3.52 | 1401 | 1754 | 2.0 |
| 68.63 | 27.74 | 3.63 | 1306 | 1659 | 1.0 |
| 61.06 | 34.95 | 3.96 | 1068 | 1374 | <1.0 |
| 62.46 | 32.81 | 4.73 | 1162 | 1489 | 1.0 |

While the mechanical characteristics set forth in Table II were measured prior to the formation of an electroconductive oxide layer on the surface of the composites, it is believed that the data in Table II is representative of the mechanical characteristics of electrodes of the present invention. Those skilled in the art will note that the ultimate tensile strengths set forth in Table II are generally about 5 to about 12 times the ultimate tensile strengths of lead and lead alloys. The yield strengths set forth in Table II are about 10 to about 19 times the yield strength of lead and lead alloys.

In order to give those skilled in the art a more complete description of the invention the following examples in addition to those of the drawings and those set forth hereinbefore are given.

EXAMPLES

A number of lead-titanium compacts, adapted to be externally oxidized by anodic action were made using various compacting pressures on titanium powder made by grinding titanium sponge. Subsequent to compacting the compacts were sintered in argon and infiltrated with molten lead. Porosity and volume percent lead values obtained are set forth in Table III.

TABLE III

| Test Specimen | Compacting Pressure Tons/in$^2$ | kg/cm$^2$ | % Porosity in Sintered Ti | Vol. % Lead in Final Product |
|---|---|---|---|---|
| 1 | 0 | 0 | 58.6 | 55 |
| 2 | 1 | 140.9 | 39.1 | 36 |
| 3 | 2 | 281.9 | 37.4 | 33 |
| 4 | 4 | 563.7 | 34.7 | 30 |
| 5 | 6 | 845.6 | 31.6 | 27 |
| 6 | 8 | 1127.4 | 29.1 | 25 |
| 7 | 10 | 1409.3 | 25.6 | 21 |
| 8 | 20 | 2818.6 | 18.3 | 15 |
| 9 | 25 | 3523.2 | 17.2 | 11 |
| 10 | 30 | 4227.9 | 15.3 | 10 |
| 11 | 35 | 4932.6 | 11.3 | 10 |

Test specimens 8 through 11 as well as other specimens of composite titanium-lead structures containing about 5 to about 50 volume percent lead have been exposed as anodes in a 37% solution of sulfuric acid in water under oxygen discharge conditions of 5 mA/cm$^2$ for greater than 318 days without failure.

The data set forth in Table IV shows the variation in resistivity in the metallic composite structure underlying the oxidized surface of titanium-lead structures of the present invention dependent upon the temperatures used in the lead impregnation of the sintered titanium compact.

TABLE IV

Resistivity of Composite Materials (in microhm-cm)
(Effect of Temperature of Lead Bath)

| Test Specimen | Nominal Vol. % Pb | Temperature of Lead Bath, Degree C | | |
|---|---|---|---|---|
| | | 550 | 600 | (675)* |
| 12 | 24 | — | 45.0 | — |
| 7 | 21 | 44.8 | — | — |
| 13 | 28 | — | — | 79.4 |
| 14 | 27 | — | 44.6 | — |
| 6 | 25 | 43.8 | — | — |
| 15 | 31 | — | — | 78.2 |
| 16 | 30 | — | 42.0 | — |
| 5 | 27 | 42.4 | — | — |
| 17 | 34 | — | — | 82.8 |
| 18 | 31 | — | 43.8 | — |
| 4 | 30 | 41.4 | — | — |
| 19 | 37 | — | — | 93.8 |
| 20 | 36 | — | 42.7 | — |
| 3 | 33 | 41.8 | — | — |
| 21 | 41 | — | — | 90.5 |
| 12 | 37 | — | 41.4 | — |
| 2 | 36 | 38.9 | — | — |
| 23 | 41 | — | — | 75.2 |
| 24 | 55 | — | 37.8 | — |
| 1 | 55 | 33.9 | — | — |
| — | 60 | — | — | 58.2 |

*Approximate

The significantly higher resistivities experienced at the highest impregnation temperature set forth in Table IV are believed to be caused, at least in part, by intermetallic compound formation between lead and titanium. While these higher resistivities are still within the range of operability contemplated in accordance with the present invention, nonetheless, they are normally less desirable than the lower resistivities obtained at lower impregnation temperatures.

Three titanium-lead electrodes and one lead-tin electrode (for reference) were provided for nickel electrowinning. These anodes are described in Table V.

TABLE V

Identification of Anodes for Electrowinning Tests

| Test Specimen | wt. % Pb | Vol. % Pb | Approximate Size, mm | weight, grams |
|---|---|---|---|---|
| 26 | 36.1 | 17.4 | 25 × 70 × 3 | 29.00 |
| 27 | 26.1 | 11.9 | 25 × 70 × 3 | 29.68 |
| 28 | 76.6 | 51.2 | 25 × 70 × 4 | 61.33 |
| Pb—Sn | 85 | 79 | 30 × 70 × 1 | 29.76 |

These electrodes were used as anodes in four individual electrolytic cells. The electrolyte had the following composition:

| | |
|---|---|
| Nickel | 70 grams per liter |
| Sulfuric Acid | 40 grams per liter |
| Sodium Sulfate | 100 grams per liter |
| Boric Acid | 10 grams per liter |
| pH = 0.5 | |
| Temperature = 70C | |

The top parts of each electrode was coated with an insulating film so that the active area was exactly 30 cm$^2$. The voltage of each cell was adjusted to provide an operating current of 0.75 amp., i.e., an anode current density of 25 mA/cm$^2$. Pure nickel cathode strips were placed on each side of the anodes.

The electrowinning cells were operated intermittently over a period of six weeks. At the end of that period, the following tabulated measurements were made.

TABLE VI

Measurement on Nickel Electrowinning Cells

| Test Specimen | Operating Voltage | Anode wt. loss % | Cathode Metal Collected, grams |
|---|---|---|---|
| 26 | 3.07 | 0 | 113 |
| 28 | 2.64 | 4 | 109 |
| 27 | 2.89 | 5 | 114.5 |
| Pb—Sn | 2.74 | 4 | 114.5 |

After about 2 weeks of operation the electrolyte appeared cloudy and was analyzed for the presence of Pb or Ti contaminants. At the end of the 6 week period, the cathodic deposits were also analyzed. The results of these analysis are shown on Table VII.

TABLE VII

Results of Chemical Analysis wt. %

| Test Specimen | Cathodic Deposit | | | Electrolyte | |
|---|---|---|---|---|---|
| | Pb | Ti | Sn | Pb | Ti |
| 26 | .14 | <.002 | <.005 | <.0005 | <.002 |
| 27 | .063 | <.002 | <.005 | <.0005 | <.002 |
| 28 | .058 | <.002 | <.005 | .0006 | <.002 |
| Pb—Sn | .14 | <.002 | .049 | .0015 | <.002 |

The above results show that the Ti-Pb composite material used as an anode for a nickel electrowinning cell would not contaminate the deposit as much as does the Pb-Sn anode. Since the conditions for this nickel electrowinning test are more severe than for copper, manganese, or zinc electrowinning, it is probable that the lead titanium composite would be suitable for copper, manganese or zinc electrowinning as well.

Chorine Production

A cylindrical electrode of titanium-lead composite material was prepared as follows: A thin cylindrical rod of steel-copper cored titanium, (5.1 mm in dia) prepared as described in U.S. patent application Ser. No. 753,481 was inserted coaxially in a glass tube 12.5 mm internal diameter. The space between the rod and the glass tube was filled with loose titanium powder (−325 mesh). The compact was then sintered at 1500 F.(843 C.) for 2 hours in argon. After sintering, the glass envelope was removed. The resultant rod of porous titanium, bonded to the central steel-copper cored titanium spike, weighed 37.76 grams. This compact was then immersed in a batch of molten lead, 0.5 wt. % tin alloy for 1 hour at 550 C. The finished titanium lead composite weighed 109.5 grams. The rod was 12.3 mm in diameter 100 mm long and contained 65.5% lead-tin by volume. The anode was immersed to a depth of 3 inches (7.5 cm) in a saturated solution of sodium chloride. A pure nickel sheet on the inside wall of a large beaker served as cathode. The working area of anode was 4.57 in$^2$ (29.5 cm$^2$). For test purposes, a constant current of 4 amps was imposed on the cell with a voltage of 3.7 volts. This corresponds to an anode current density of 0.875 A/in$^2$ (135 mA/cm$^2$) which is about 2 to 4 times the current density used in commercial caustic/chlorine production cells. Evolution of chlorine at the anode, and hydrogen at the cathodic was observed as soon as the current was applied. This chlorine cell has been in operation for 60 days continuously. The anode has been rinsed, dried and weighed each day.

The results of weight measurements of the anode are summarized in Table VIII.

TABLE VIII

Weight of Chlorine Cell Anode

| Days | Grams | % Change |
|---|---|---|
| 0 | 108 | 0 |
| 5 | 100.5 | 6.9 |
| 10 | 99.2 | 8.1 |
| 15 | 97.5 | 9.7 |
| 20 | 95.5 | 11.6 |
| 25 | 93.7 | 13.2 |
| 30 | 91.9 | 14.9 |
| 35 | 89.7 | 16.9 |

Extrapolation of the data in Table VIII shows that this electrode should last about 200 days assuming that the weight continues to decrease at the present rate. Considering the high current density, it is believed that this would be very good performance for a chlorine producing anode.

Cathodic Protection in Seawater

Two samples of titanium-lead composites were tested for use as cathodic protection anodes in seawater at approximately 25° C. Under galvanostatic polarization conditions both composites, one containing 22.2 volume percent lead and 2.2 volume percent pores and the other containing 33.8 volume percent lead and 2.8 volume percent pores, behaved similarly. Each composite as an anode gave an essentially straight line relationship between potential and current density over the range of 100 mA/cm$^2$ at about 2.5 volts to about 550 mA/cm$^2$ at about 8 volts. For purposes of cathodic protection anodes the composite material of the present invention should be rolled or otherwise mechanically worked in order to minimize porosity. Porosity should be reduced to below about 3% or even below about 2% in order to minimize or eliminate pitting during use.

Cells with Tubular Positives

Several samples of titanium-lead composites were tested for use as spines in the tubular positives or lead-acid storage batteries. Cells were made up of standard negatives and tubular positives containing spines of titanium-lead composites. The latter were made from rectangular sections by sawing them into pieces about 6 mm square by 75 mm long. One end of the pieces was lead plated in the shape of a small cap so that lead conductors could be easily soldered thereto. After mounting in tubes and filling with tubular type positive active material, they were assembled into cells containing standard negatives. For control cells, tubes were made containing similarly shaped spines of cast pure lead and of 5% antimonial lead. The results to date are given in Table IX.

TABLE IX

| Test Specimen | Infiltrant | Vol. % Infiltrant | Discharge Capacity in AH/g of Tubular Cells Discharge Cycle* | | | | | |
|---|---|---|---|---|---|---|---|---|
| | | | 1 | 10 | 20 | 30 | 40 | 54 |
| Pure Lead | — | — | .1028 | .1039 | .0696 | .0259 | .0396 | .0843 |
| 5% Sb Lead | — | — | .0799 | .0927 | .0880 | .0686 | .0793 | .0899 |
| 35 | Pb | 55 | .0836 | .0839 | .0623 | .0816 | .0792 | .0723 |
| 36 | Pb—0.5% Sn | 52 | .1018 | .0710 | .0517 | .0547 | .0569 | .0866 |
| 37 | Pb—0.5% Sn | 52 | .1046 | .0854 | .0366 | .0404 | .0488 | .0607 |

*Discharge Cycle = No. of cycles ending in complete discharge

The discharge capacities found so far for cells containing titanium-lead composite spines are not appreciably different from the controls, and therefore, they can be used to realize the full advantage of these spines–long cycle life, (i.e., the electrical performance is as good as in standard designs).

Grids corrode principally on overcharge. When test piece of similar composition to the composites of Table IX were exposed to continuous overcharge at 5 mA/cm$^2$ for 64 days, PbO$_2$ penetrated to a depth of only 7.5 mils (0.19 mm). At this rate and with two hours of overcharge per cycle, the corrosion rate should be about 1 mil (0.025 mm) per 100 cycles. It is believed that this would constitute exceptional performance for these grids.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A process for producing an article of manufacture adapted to be used with an electrolyte such that in use at least part of the surface of said article is exposed to said electrolyte and, at least part of the time, is at an oxidizing potential comprising
   A. forming a structurally strong body of metal passivatable in said electrolyte at said oxiding potential in the configuration of said article, said body containing pores, and
   B. filling said pores, at least in the vicinity of the surface of said article to be exposed to said electrolyte with an electroconductive oxide insoluble in said electrolyte in sufficient amount to block entry of said electrolyte into said pores and provide sufficient electrical resistance to inhibit oxidation of metal at the inner face of said electroconductive oxide.

2. A process as in claim 1 wherein the structurally strong body of metal is formed by sintering a shaped mass of metal powder to provide a maze of interconnected pores in said body.

3. A process as in claim 1 wherein the structurally strong body of metal is formed in the configuration of a lead-acid battery grid.

4. A process as in claim 3 wherein positive lead-acid material is pasted on the surface of said grid exposed in use to electrolyte.

5. A process as in claim 1 wherein the metal passivatable in said electrolyte is titanium, tantalum, niobium or alloys thereof.

6. A process as in claim 1 wherein the pores are filled with electroconductive oxide by infiltrating the porous structurally strong body with a metal or alloy which can form an electroconductive oxide and thereafter electrochemically oxidizing said metal or alloy to form said electroconductive oxide.

7. A process as in claim 1 wherein titanium powder is compressed, if necessary, and sintered to form a structurally strong body of titanium having about 5% to 50% by volume of pores.

8. A process as in claim 6 wherein the porous structurally strong body comprises essentially titanium and is infiltrated with lead or a lead alloy.

9. A process as in claim 1 wherein said structurally strong body is formed in metallurgically bonded association with a solid mass of metal.

10. A process as in claim 9 wherein the said metal of said solid mass of metal is an electrochemical valve metal.

11. A process as in claim 9 wherein said solid mass of metal is a metal from the group of copper, iron, aluminum and alloys thereof.

12. A process as in claim 10 wherein said solid mass of electrochemical valve metal is positioned with relation to said porous matrix to form an impermeable barrier across said matrix.

13. A process as in claim 12 wherein subsequent to the formation of said matrix with said barrier, a protective metallic layer is provided on one side of said barrier and the pores in the matrix on the other side of said barrier are filled, at least in the volumes of pores adjacent the exposed surface, with electroconductive oxide.

14. A process as in claim 13 wherein said matrix is shaped in the form of a bi-polar lead-acid battery grid, negative lead-acid active material is positioned on said protective metallic layer and positive lead-acid active material is positioned on the free surface on the other side of said barrier.

* * * * *